3,103,433
BORON TRIFLUORIDE S,S,S-TRIBUTYL TRITHIOPHOSPHATE DEFOLIANT

Arthur Dock Fon Toy, Park Forest, Ill., Ralph B. Fearing, Hammond, Ind., and Chester L. Dewald, Cupertino, Calif., assignors to Stauffer Chemical Company, New York, N.Y., a corporation of Delaware
No Drawing. Filed Oct. 2, 1961, Ser. No. 142,015
4 Claims. (Cl. 71—2.7)

The present invention is directed to a new compound, $(C_4H_9S)_3POBF_3$, a method of preparing said compound and its use in regulating the activity and growth of plant life.

In particular, we have found that S,S,S-tributyl trithiophosphate reacts with boron trifluoride, a strong electron-acceptor substance, to form a stable addition compound having utility as a herbicide and defoliant. The structure of the addition compound may be represented by the formula:

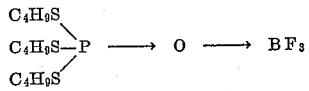

wherein each arrow indicates a shared pair of electrons. As shown, the boron trifluoride addition takes place at the oxygen.

One method of preparing the novel compound comprises reacting a compound of the formula:

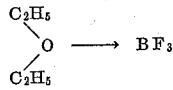

with S,S,S-tributyl trithiophosphate and boiling the boron trifluoride-free ethyl ether from the addition product after reaction. Another method comprises reacting gaseous boron trifluoride with S,S,S-tributyl trithiophosphate. Each method results in an essentially quantitative yield.

*Example.*—A 24.2 gram (0.077 mole) sample fo S,S,S-tributyl trithiophosphate ($N_D^{25}=1.532$ and specific gravity=1.05) was treated at room temperature with 10 cc. (10.9 grams or 0.077 mole) boron trifluoride etherate and the reaction product was concentrated to 40° C. at 2 mm. Hg. A cold trap employing Dry Ice was used to condense the vapors during concentration. The liquid recovered from the cold trap was non-fuming, indicating the absence of $BF_3$ etherate, and had a specific gravity of 0.72 compared to 0.708 for ethyl ether. The residue consisted of 29.1 grams of a clear, free-flowing liquid of the formula $(C_4H_9S)_3POBF_3$ (99% of theoretical yield) having an index of refraction $N_D^{25}=1.5000$, specific gravity of 1.12, mammalian toxicity (white mice) $MLD_{50}=500$, and an analysis of 8.2% P, 25.0% S, and 2.74% B, compared to 8.1% P, 25.1% S, and 2.83% B, theoretical. This liquid was found to be readily soluble in xylene and, contrary to the S,S,S-tributyl trithiophosphate reactant, insoluble in kerosene.

The compound of the invention exhibits good activity as a plant growth regulator and is especially effective as a cotton defoliant.

Today, cotton defoliation is an important agricultural aid. In order to produce a cleaner, higher grade of mechanically picked raw cotton, it is desirable to first cause the leaves to fall off by the application of a chemical defoliant. Such procedure is also valuable in harvesting beans and other crops.

To evaluate the defoliating properties of the compound of the invention, mature cotton plants were sprayed with an aqueous emulsion of the active compound of the invention at a rate equivalent to two or four pounds of the active compound in 80 gallons of emulsion for each planted acre. The treated plants were then stored in a greenhouse and inspected at 24 hour intervals. Percentage defoliation was calculated by dividing the number of fallen leaves by the number originally attached. Results of such test on the compound of the invention are reported in Table I wherein the data also include results obtained on a cotton defoliant presently in wide commercial use.

TABLE I
*Cotton Defoliation*

| Compound | 4 lbs./acre | 2 lbs./acre | | | | | |
|---|---|---|---|---|---|---|---|
| | 6 days after application, percent def. | Days after application | | | | | Total percent def. |
| | | 1, percent def. | 2, percent def. | 3, percent def. | 4, percent def. | 5, percent def. | |
| $(C_4H_9S)_3POBF_3$ | 100 | 0 | 0 | 30 | 80 | 95 | 95 |
| The Commercial Defoliant | 100 | 0 | 0 | 30 | 70 | 85 | 85 |

Satisfactory commercial cotton defoliation may be accomplished at a rate of from about 0.5 to about 5.0 pounds of addition compound per acre of planted cotton.

The new compound may be applied to plants in the form of solutions, emulsions, dusts or aerosols, according to procedures well-known in the art. Aqueous, as well as non-aqueous solutions are equally suitable. Dusts may be prepared directly at field strength using well-known absorbent clays or talcs or they may be prepared as concentrates which may then be diluted with inert diluents for field application.

The compound of the present invention was also tested for herbicidal activity on some economically important plant species. The data obtained from such tests are reported in Table II wherein "+" is slight injury, "++" is moderate injury, and "+++" is severe injury to plant life.

TABLE II
*Herbicidal Activity*

| | Foxtail | Oats | Mustard | Annual Bluegrass |
|---|---|---|---|---|
| Pre-emergence | ++ De. | | | ++ |
| Post-emergence | +++ | + | ++ | |

De. represents desiccation.

Pre-emergence herbicidal tests were conducted following planting, but prior to emergence of the plants, usually the day following planting. The active compound was applied at a concentration of 20 pounds of active material, diluted in water to a volume of 80 gallons, for each acre treated. The aqueous herbicidal solution was simply sprayed on the preplanted soil. After fourteen days the plants were inspected and compared with an untreated control group planted on the same day.

Post-emergence herbicidal tests were initiated approximately two weeks following emergence of the test plants. The method of application involved spraying on the plant foliage a 0.2% aqueous solution of the active compound to the point of run-off. The concentration of active material was approximately 25 pounds per planted acre. Plant injury was rated after 21 days.

The foregoing description is given for clearness of understanding only and no unnecessary limitations should be understood therefrom, as modifications will be obvious to those skilled in the art.

What we claim is:

1. As a new composition of matter, the boron trifluoride addition compound of S,S,S-tributyl trithiophosphate.

2. A method of defoliating plants which comprises applying thereto in an amount sufficient to cause defoliation, the boron trifluoride addition compound of S,S,S-tributyl trithiophosphate.

3. A method of defoliating cotton which comprises applying thereto the boron trifluoride addition compound of S,S,S-tributyl trithiophosphate at the rate of between about 0.5 and 5 pounds of said compound per acre.

4. A method of preparing the boron trifluoride addition compound of S,S,S-tributyl trithiophosphate which comprises reacting S,S,S-tributyl trithiophosphate with a compound selected from the group consisting of boron trifluoride and boron trifluoride etherate, and recovering the boron trifluoride addition compound of S,S,S-tributyl trithiophosphate.

References Cited in the file of this patent

UNITED STATES PATENTS

| | | |
|---|---|---|
| 2,852,549 | Coover et al. | Sept. 16, 1958 |
| 2,943,107 | Rattenbury et al. | June 28, 1960 |
| 2,965,467 | Markley | Dec. 20, 1960 |